US012674241B2

(12) United States Patent
Xi et al.

(10) Patent No.: US 12,674,241 B2
(45) Date of Patent: Jul. 7, 2026

(54) METHOD FOR IN-SITU SYNTHESIS OF TUNGSTEN CARBIDE POWDER

(71) Applicant: Beijing University of Technology, Beijing (CN)

(72) Inventors: Xiaoli Xi, Beijing (CN); Liwen Zhang, Beijing (CN); Zuoren Nie, Beijing (CN)

(73) Assignee: Beijing University of Technology, Beijing (CN)

( * ) Notice: Subject to any disclaimer, the term of this patent is extended or adjusted under 35 U.S.C. 154(b) by 748 days.

(21) Appl. No.: 18/168,819

(22) Filed: Feb. 14, 2023

(65) Prior Publication Data

US 2023/0193488 A1 Jun. 22, 2023

Related U.S. Application Data

(63) Continuation of application No. PCT/CN2021/088333, filed on Apr. 20, 2021.

(30) Foreign Application Priority Data

Mar. 10, 2021 (CN) .......................... 202110261195.5

(51) Int. Cl.
C25B 11/042 (2021.01)
C01B 32/949 (2017.01)
C25B 1/01 (2021.01)

(52) U.S. Cl.
CPC .......... C25B 11/042 (2021.01); C01B 32/949 (2017.08); C25B 1/01 (2021.01); *C01P 2004/62* (2013.01); *C01P 2004/64* (2013.01)

(58) Field of Classification Search
CPC C25B 11/042; C25B 1/01; C25B 9/09; C25B 15/00; C25B 1/00; C01B 32/949;
(Continued)

(56) References Cited

U.S. PATENT DOCUMENTS 4,234,333 A * 11/1980 Ghandehari .......... C01B 32/949
205/717
4,349,423 A * 9/1982 Nutzel ...................... C25F 3/02
205/717
(Continued)

FOREIGN PATENT DOCUMENTS

CN 104018190 A 9/2014
CN 105648465 A 6/2016
(Continued)

OTHER PUBLICATIONS

Zhang et al., A new method for preparation of tungsten carbide powder by in situ electrochemical reduction, Electrochemistry Communications 134 (2022) 107179; pp. 1-4; https://doi.org/10.1016/j.elecom.2021.107179.

*Primary Examiner* — Bryan D. Ripa
(74) *Attorney, Agent, or Firm* — Duane Morris LLP

(57) ABSTRACT

The present disclosure provides a method for in-situ synthesizing tungsten carbide powder. In this method, cemented carbide scrap is used as an electrode and the molten salt electrolysis process is used to in-situ synthesize tungsten carbide powder, where a bidirectional pulse is used in the molten salt electrolysis process. In the method provided by the present disclosure, by using the bidirectional pulse and using the cemented carbide scrap as electrode in the molten salt medium, when the tungsten carbide scrap is oxidized, tungsten is dissolved in ionic form, deposited after the direction of current changes, and reacted with the carbon anode sludge in situ to generate tungsten carbide powder. In the present disclosure, the carbon anode sludge is treated appropriately, the recycled product can be used in upmarket application, there is no need to apply complicated processes to process the tungsten powder into tungsten carbide, and the
(Continued)

tungsten carbide nanopowder with high-performance can be recycled and prepared in a short process.

12 Claims, 6 Drawing Sheets

(58) Field of Classification Search
CPC ... C01P 2004/62; C01P 2004/64; Y02P 10/20; B82Y 30/00; B82Y 40/00
See application file for complete search history.

(56) References Cited

U.S. PATENT DOCUMENTS

| | | | | |
|---|---|---|---|---|
| 5,384,016 | A * | 1/1995 | Lin | C01B 32/949 |
| | | | | 205/478 |
| 9,656,873 | B2 * | 5/2017 | Mehrotra | C01B 32/949 |
| 10,369,631 | B2 | 8/2019 | Wang | |
| 10,519,556 | B2 | 12/2019 | Nie et al. | |
| 10,940,538 | B2 * | 3/2021 | Mehrotra | C22C 29/08 |
| 2016/0208398 | A1 * | 7/2016 | Nie | C25C 3/34 |
| 2017/0209933 | A1 * | 7/2017 | Wang | B22F 9/24 |

FOREIGN PATENT DOCUMENTS

| | | | | |
|---|---|---|---|---|
| CN | 106544701 A | 3/2017 | | |
| CN | 106795580 A | 5/2017 | | |
| CN | 108910966 A | 11/2018 | | |
| CN | 109208046 A | 1/2019 | | |
| CN | 111039290 A | 4/2020 | | |
| WO | WO-2019104809 A1 * | 6/2019 | | C25C 5/04 |

* cited by examiner

Time of electrolysis (s)

Time of electrolysis (s)

20 (degree)

Time of electrolysis (s)

Time of electrolysis (s)

METHOD FOR IN-SITU SYNTHESIS OF TUNGSTEN CARBIDE POWDER

PRIORITY CLAIM AND CROSS-REFERENCE

The present application is a continuation of International Application No. PCT/CN2021/088333, filed on Apr. 20, 2021 and published as WO 2022/188240 on Sep. 15, 2022, which claims priority to Chinese Application, No. 202110261195.5, filed on Mar. 10, 2021, entitled "Method for In-Situ Synthesis of Tungsten Carbide Powder", which applications are hereby incorporated by reference in entirety.

TECHNICAL FIELD

The present disclosure relates to the technical field of molten salt electrochemistry, in particular to a method for in-situ synthesizing tungsten carbide powder.

BACKGROUND

Since cemented carbide is the main application field of tungsten, and the content of tungsten in cemented carbide scrap is up to 74%-99%, cemented carbide scrap is an important secondary resource of tungsten. At present, the proportion of recovery of cemented carbide scrap to total tungsten consumption is roughly below 25%. It has a great significance to promote the sustainable development of tungsten resource that achieving the efficient recovery of cemented carbide scrap and obtaining a high-performance product in a short process.

There are more than a dozen industrial regeneration methods for cemented carbide, such as saltpeter method, sodium sulfate smelting method, chlorinating method, inorganic acid leaching method, high temperature treating method, mechanical crushing method, zinc melting method, molten salt electrolysis process and redox method, etc. These regeneration methods may be divided into two categories according to regenerated products. In one of them, such as the mechanical crushing method, inorganic acid leaching method and zinc melting method, etc., only cobalt as binder phase and tungsten carbide as hard phase are separated to recycle tungsten carbide powder and cobalt, and the tungsten carbide recycled by these methods is degraded after undergoing further crush and carbon supplement, which is difficult to be used in upmarket application. In another one of them, such as saltpeter method, high temperature treating method, molten salt electrolysis process, etc., tungsten-carbon bond in tungsten carbide is broken completely to recycle tungsten products, and tungsten powder products obtained by these methods can be further processed.

The molten salt electrolysis process has attracted much attention because of its advantages of short process, small land occupation of plant, small consumption of water and not producing waste acid or waste alkali in the treatment process.

SUMMARY

The present disclosure provides a method for in-situ synthesizing tungsten carbide powder, which is a breakthrough compared with the conventional electrolysis by direct current and achieves that the tungsten carbide nanopowder with high-performance can be recycled and prepared in a short process.

The solutions used in the present disclosure are as follows.

The present disclosure provides a method for in-situ synthesizing tungsten carbide powder, which uses cemented carbide scrap as an electrode, and in-situ synthesizes tungsten carbide powder by a molten salt electrolysis process, where bidirectional pulse is used to electrolyse in the molten salt electrolysis process.

Electrolysis process (including molten salt electrolysis process) is a method of conducting redox reaction using direct current to make the target metal continuously separate out at cathode. At present, the product obtained by recycling cemented carbide scrap using molten salt electrolysis process is tungsten powder, which requires to be further processed to obtain tungsten carbide, the most common form of tungsten. The common method of producing tungsten carbide with tungsten powder is as follows. The tungsten powder with the average particle size of 3-5 μm and carbon black with the same amount of substance are dry-mixed intensively by a ball grinder. The mixture after compression molding is placed on the graphite plate, and the graphite plate with the mixture is heated to 1400-1700° C. in a graphite resistance furnace or electric induction furnace, where the temperature is preferably controlled at 1550-1650° C. Under a hydrogen flow; $W_2C$ is generated initially, and WC is generated under the continued reaction at high temperature.

The present disclosure breaks the conventional mindset and creatively proposes to use pulse bidirectional electrolysis (PBE) in molten salt electrolysis process. In the present disclosure, cemented carbide scrap is used as an electrode in molten salt medium and when the tungsten carbide scrap is oxidized, tungsten is dissolved in ionic form and carbon floats near the anode, and tungsten is deposited after the direction of current changes and reacted with the carbon anode sludge in situ to generate tungsten carbide powder. In the present disclosure, the carbon anode sludge is treated appropriately, the recycled product can be used in upmarket application, there is no need to apply complicated processes to process the tungsten powder into tungsten carbide, and the tungsten carbide nanopowder with high-performance can be recycled and prepared in a short process.

In an embodiment of the present disclosure, a ratio of a height of a forward pulse to a height of a reverse pulse is 1:1 and a ratio of time of the forward pulse to time of the reverse pulse is 1:1.

Preferably, the height of the forward pulse is 150-250 mA and the time of the forward pulse is 30-50 s.

Preferably, in the above-mentioned solutions, molten salt of fluoride and/or chloride is used as electrolyte in the molten salt electrolysis process. More preferably, a molten salt of fluoride such as NaF, KF, LiF, or a combination thereof is used as electrolyte. For example, NaF—KF molten salt, i.e., a molten salt comprising a mixture of NaF and KF, is used as electrolyte.

The purity of the tungsten carbide powder made according to the method described in the present disclosure is more than 99% and the tungsten carbide powder can be used as an upmarket product for application. In some embodiments, the tungsten carbide powder such as nanopowder has a chemical formula WC, without or with trace amounts of impurities. The tungsten carbide nanopowder may have a particle size in a range from about 1 nm to about 1,000 nm, measured by transmission electron microscope (TEM). For example, in accordance with some embodiments, the tungsten carbide nanopowder has a particle size in a range of from about 80 nm to about 100 nm based on the experiments described herein.

The present disclosure provides a method for in-situ synthesizing tungsten carbide powder. In this method, by using the bidirectional pulse and using the cemented carbide scrap as electrode in the molten salt medium, when the tungsten carbide scrap is oxidized, tungsten is dissolved in ionic form, deposited after the direction of current changes, and reacted with the carbon anode sludge in situ to generate tungsten carbide powder. In the present disclosure, the carbon anode sludge is treated appropriately, the recycled product can be used in upmarket application, there is no need to apply complicated processes to process the tungsten powder into tungsten carbide, and the tungsten carbide nanopowder with high-performance can be recycled and prepared in a short process.

DETAILED DESCRIPTION OF THE EMBODIMENTS

In order to explain the objectives, solutions, and advantages of the embodiments of the present disclosure more clearly, the solutions according to the embodiments of the present disclosure will be clearly and completely described below: It should be noted that, the described embodiments are part of embodiments of the present disclosure, rather than all of the embodiments. Based on embodiments in the present disclosure, all other embodiments obtained by those of ordinary skill in the art without creative work are within the scope of protection of the present disclosure.

The experimental reagents and materials used in embodiments of the present disclosure are commercially available, unless otherwise specified. The cemented carbide scraps contain tungsten and carbide. The carbide in the cemented carbide scraps acts as the source for carbon in the tungsten carbide powder as the product provided in the present disclosure. As shown in Embodiments 1 and 3 below; the two separate cemented carbide scraps are preferably used as both electrodes including both anode and cathode for desired reaction efficiency. As shown in Embodiment 2, a cemented carbide scrap can be used as one electrode while a counter electrode such as a graphite rod is used. The term "anode sludge" is used herein to indicate the place whether anodic oxidation reaction occurs. The tungsten carbide produced is in the form of powder. Such a tungsten carbide (WC)

powder falls into the electrode mud immediately after produced, so it will not participate in any further reaction.

Embodiment 1

Figure 1:
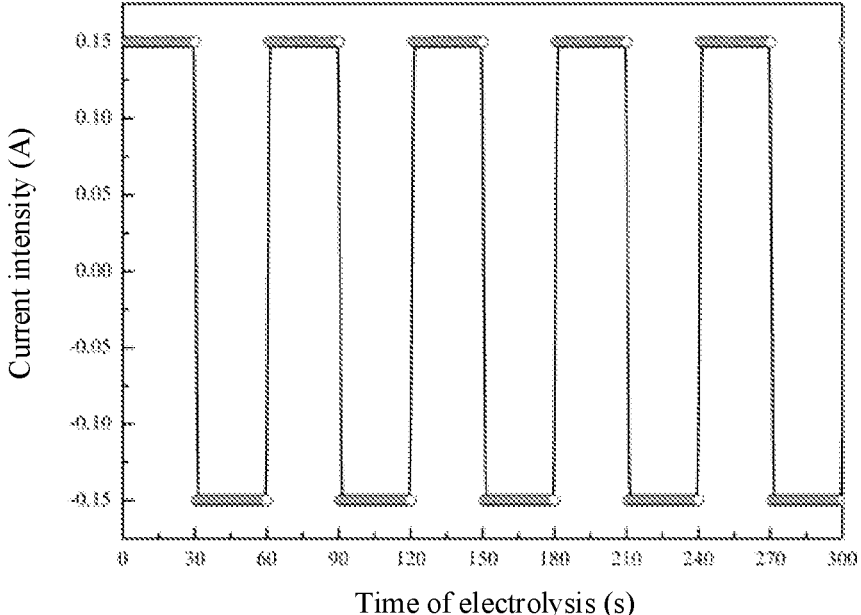
FIG. 1 is a current-time curve of the first 300 seconds(s) of the electrolysis according to Embodiment 1 of the present disclosure.
Figure 2:
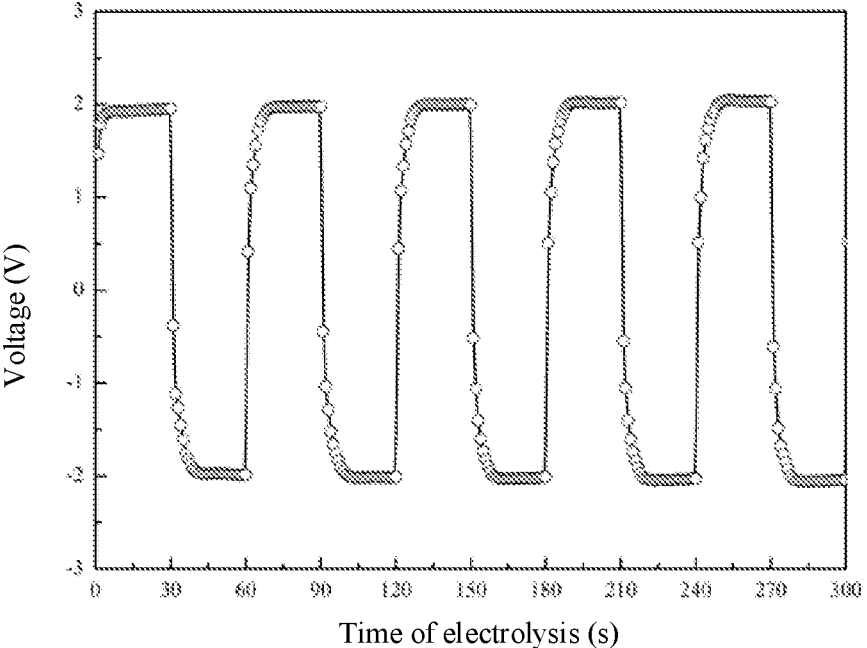
FIG. 2 is a voltage-time curve of the first 300 s of the electrolysis according to Embodiment 1 of the present disclosure.

The present embodiment provides a method for in-situ synthesizing tungsten carbide powder. The method includes the following steps: using NaF—KF molten salt having a temperature of 800° C. as electrolyte: under a protection of inert gas, applying a pulse current with a pulse height of 150 mA between two electrodes, which are two cemented carbide scraps, where the time of forward pulse is 30 s and the time of reverse pulse is 30 s; and collecting tungsten carbide powder in the molten salt after a total of 6 hours of electrolysis. The NaF—KF molten salt had a molar ratio of 2:3 for NaF to KF. FIG. 1 shows a current time curve of the first 300 s and FIG. 2 shows the voltage time curve of the first 300 s.

Figure 3:
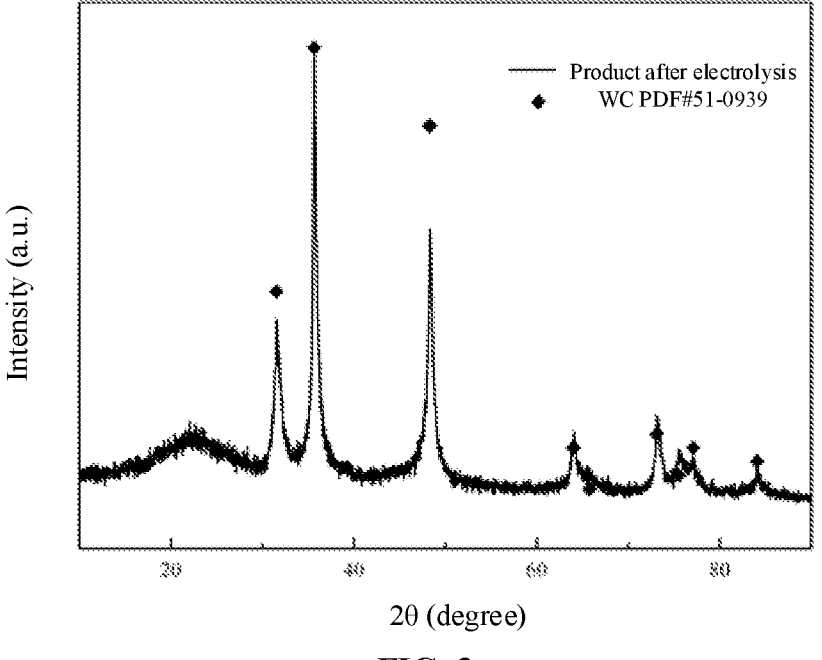
FIG. 3 is an analysis diagram about the composition of the product obtained after electrolysis for 6 hours according to Embodiment 1 of the present disclosure.

An analysis diagram about the composition of a product obtained after 6 hours of electrolysis is shown by FIG. 3, and it can be seen that the product is pure tungsten carbide, which can be used as an upmarket product.

Embodiment 2

The present embodiment provides a method for in-situ synthesizing tungsten carbide powder. The method includes the following steps: using NaF—KF molten salt (having a molar ratio of 2:3) as electrolyte: under a protection of inert gas, applying a pulse current with a pulse height of 200 mA between a working electrode which is a cemented carbide scrap and a counter electrode which is a graphite rod, where the time of forward pulse is 40 s and the time of reverse pulse is 40 s; and collecting tungsten carbide powder in the molten salt after a total of 5 hours of electrolysis.

Embodiment 3

Figure 4:
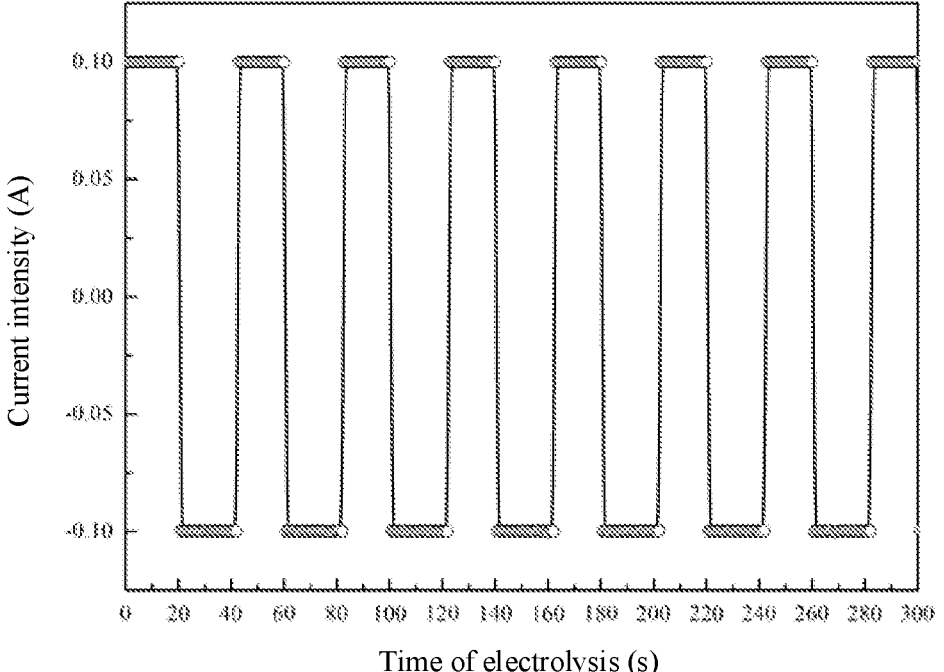
FIG. 4 is a current time curve of the first 300 s of the electrolysis according to Embodiment 3 of the present disclosure.
Figure 5:
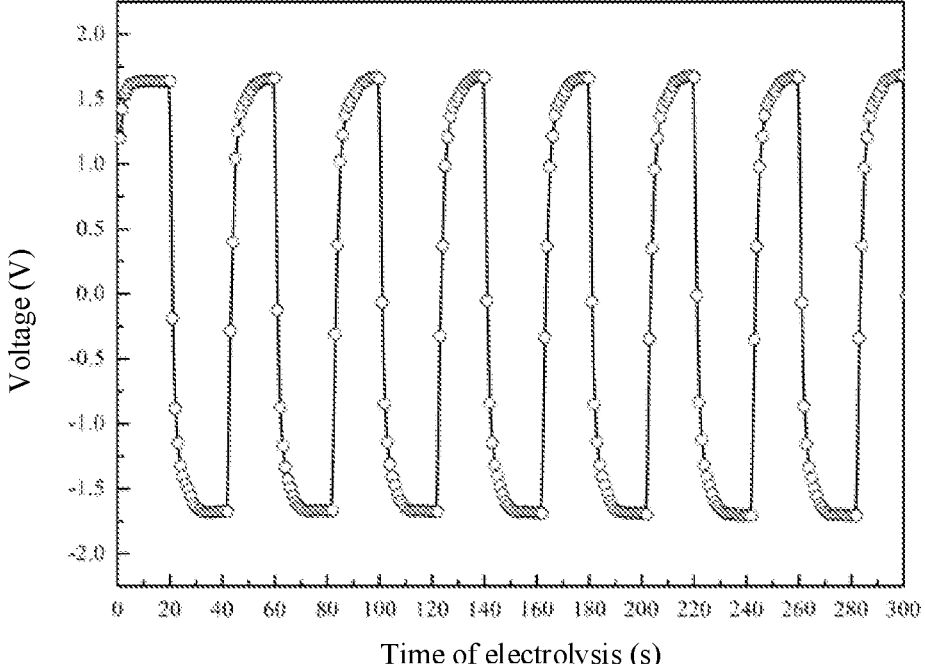
FIG. 5 is a voltage time curve of the first 300 s of the electrolysis according to Embodiment 3 of the present disclosure.

The present embodiment provides a method for in-situ synthesizing tungsten carbide powder. The method includes the following steps: using NaF—KF molten salt (having a molar ratio of 2:3) having a temperature of 800° C. as electrolyte: under a protection of inert gas, applying a pulse current with the pulse height of 100 mA between two electrodes which are two cemented carbide scraps, where the time of the forward pulse is 20 s and the time of the reverse pulse is 20 s, and collecting tungsten carbide powder in the molten salt after a total of 6 hours of electrolysis. FIG. 4 shows a current time curve of the first 300 s and FIG. 5 shows a voltage time curve of the first 300 s.

Figure 6:
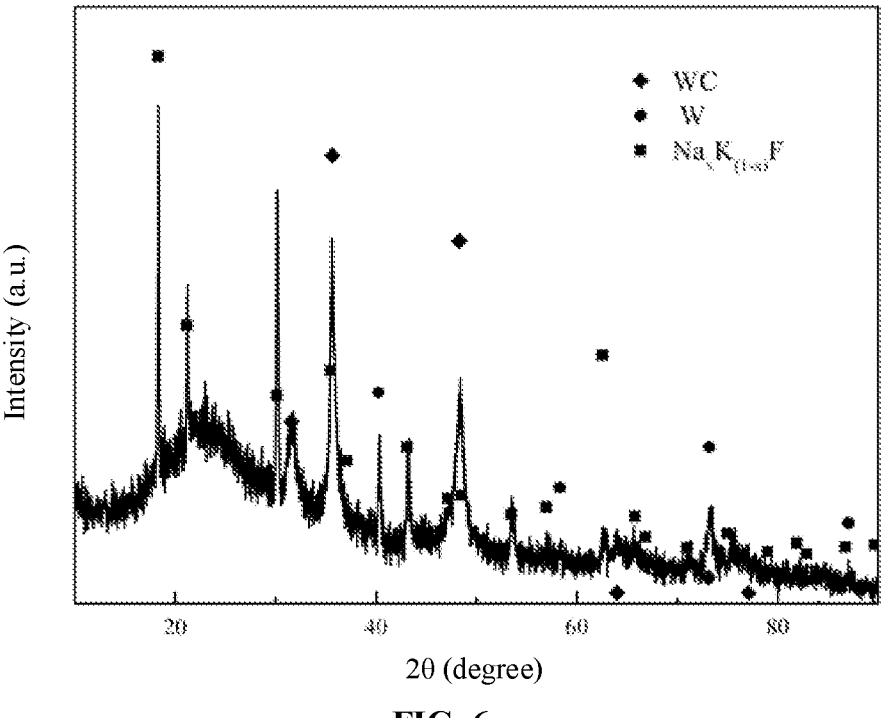
FIG. 6 is an analysis diagram about the composition of the product obtained after electrolysis for 6 hours according to Embodiment 3 of the present disclosure.

An analysis diagram about the composition of a product obtained after 6 hours of electrolysis is shown by FIG. 6, and it can be seen that the phases containing tungsten include tungsten carbide and a small amount of impurities of tungsten phase, which is a result of insufficient reaction caused by insufficient pulse height and short retention time.

It should be noted that the above embodiments are only used to explain the solutions of the present disclosure, but are not limited thereto: although the present disclosure has been described in detail with reference to the foregoing embodiments, it should be understood by those skilled in the art that they can still modify the solutions documented in the foregoing embodiments and make equivalent substitutions to a part of the features; and these modifications and substitutions do not make the essence of the corresponding solutions depart from the scope of the solutions of various embodiments of the present disclosure.

INDUSTRIAL APPLICABILITY

The present disclosure provides a method for in-situ synthesizing tungsten carbide powder. In the method provided by the present disclosure, cemented carbide scrap is used as an electrode and the molten salt electrolysis process is used to in-situ synthesize tungsten carbide powder, where a bidirectional pulse is used in the molten salt electrolysis process. In the method provided by the present disclosure, by using the bidirectional pulse and using the cemented carbide scrap as electrode in the molten salt medium, when the tungsten carbide scrap is oxidized, tungsten is dissolved in ionic form, deposited after the direction of current changes, and reacted with the carbon anode sludge in situ to generate tungsten carbide powder. In the present disclosure, the carbon anode sludge is treated appropriately, the recycled product can be used in upmarket application, there is no need to apply complicated processes to process the tungsten powder into tungsten carbide, the tungsten carbide nanopowder with high-performance can be recycled and prepared in a short process, and there is a good commercial value and application prospect.

What is claimed is:

1. A method for in-situ synthesizing tungsten carbide powder, comprising:
   using at least one cemented carbide scrap as an electrode, and in-situ synthesizing tungsten carbide powder by a molten salt electrolysis process, wherein a bidirectional pulse is used to electrolyse in the molten salt electrolysis process.

2. The method according to claim 1, wherein a ratio of a height of a forward pulse to a height of a reverse pulse is 1:1 and a ratio of time of the forward pulse to time of the reverse pulse is 1:1.

3. The method according to claim 2, wherein the height of the forward pulse is 150-250 mA and the time of the forward pulse is 30-50 s.

4. The method according to claim 1, wherein in the molten salt electrolysis process, a molten salt of fluoride and/or chloride is used as an electrolyte.

5. The method according to claim 4, wherein the molten salt comprises a mixture of NaF and KF.

6. The method according to claim 1, wherein the at least one cemented carbide scrap includes two separate cemented carbide scrap as two electrodes.

7. The method according to claim 1, wherein a purity of the tungsten carbide powder is more than 99%.

8. The method according to claim 1, wherein the tungsten carbide powder has a particle size in a range of from about 1 nm to about 1,000 nm.

9. The method according to claim 1, wherein the tungsten carbide powder has a particle size in a range of from about 80 nm to about 100 nm.

10. The method according to claim 2, wherein a purity of the tungsten carbide powder is more than 99%.

11. The method according to claim 3, wherein a purity of the tungsten carbide powder is more than 99%.

12. The method according to claim 4, wherein a purity of the tungsten carbide powder is more than 99%.

* * * * *